United States Patent Office 3,444,238
Patented May 13, 1969

3,444,238
ISOMERIZATION OF 5-METHYLMETADIOXANES
Francis Weiss, Piere-Benite, Rhone, and Arsene Isard, Saint-Genis Laval, Rhone, France, assignors to Ugine Kuhlmann, Paris, France, a French company
No Drawing. Continuation-in-part of application Ser. No. 411,580, Nov. 6, 1964. This application Feb. 6, 1968, Ser. No. 703,258
Claims priority, application France, Nov. 15, 1963, 953,922; Nov. 16, 1963, 954,002; Jan. 10, 1964, 959,873
Int. Cl. C07c 27/00, 45/00, 67/00
U.S. Cl. 260—468
12 Claims

ABSTRACT OF THE DISCLOSURE 5-methylene metadioxanes of the formula

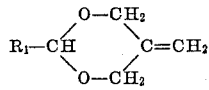

wherein $R_1$ represents a hydrogen atom or a hydrocarbon radical containing 1 to 18 carbon atoms is isomerized to produce, depending on the starting metadioxane, (I) a methallylic ester of the formula

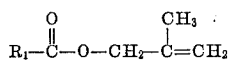

or when $R_1$ in the starting metadioxane is a vinyl radical of the formula

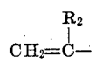

wherein $R_2$ is a hydrogen atom or a lower alkyl containing 1 to 5 carbon atoms, a mixture of (I) and (II) 2-methyl-4-methylene glutaraldehyde of the formula

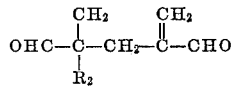

CROSS REFERENCE TO RELATED APPLICATION

This is a continuation-in-part application of our co-pending United Statese patent application, Ser. No. 411,-580, entitled, "Isomerization of Methylene-5-Metadioxanes" filed on Nov. 6, 1964.

BACKGROUND OF THE INVENTION (I) Field of the invention.—This invention relates to thermal isomerization of 5-methylene metadioxane and, more particularly, to the production of methallylic esters and 2-methyl-4-methylene glutaraldehyde.

(II) Description of the prior art.—Heretofore, methallylic esters are produced by esterifying their corresponding alcohols with an organic acid in the presence of a strong mineral acid as a catalyst. The prior method produced poor results because of the strong tendency of methallylic alcohols to isomerize into saturated isomeric aldehydes. It has also been proposed to isomerize substituted metadioxanes of the following general formula

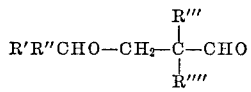

wherein R''' and R'''' represent an alkyl or an aryl radical, at a temperature between 250° C. and 550° C. in the presence of a catalyst such as pumice or certain silicas. This isomerization process, however, produced β-alkoxyaldehyde of the following general formula

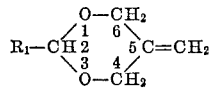

SUMMARY OF THE INVENTION

We have now found that by using, as a starting material, 5-methylene metadioxane in which the position 5 is occupied by an alkylidenic substituent and at least one of the substituents in position 2 is a hydrogen atom in accordance with the formula as follows:

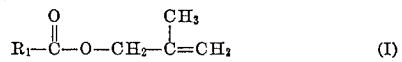

the thermal isomerization proceeds at an entirely different rate, and in a different manner so much so that it leads to the production of an ester of a methallylic alcohol of the formula

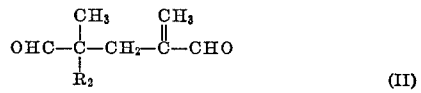 (I)

Furthermore, the presence of a catalyst in the isomerization of this invention becomes optional.

We have also found that when the starting material is a 5-methylene metadioxane of the aforesaid formula in which $R_1$ is a vinyl radical

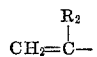

wherein $R_2$ represents a hydrogen atom or a lower alkyl containing 1 to 5 carbon atoms, the isomerization produces, in addition to the methallylic ester of the Formula I, a new composition of matter, 2-methyl-4-methylene glutaraldehyde as represented by the general Formula II $$OHC-\underset{R_2}{\overset{CH_3}{\underset{|}{C}}}-CH_2-\overset{CH_3}{\underset{\|}{C}}-CHO \quad (II)$$

The isomerization of this invention is preferably carried out by subjecting the suitable metadioxane vapor to a thermal molecular rearrangement at a temperature between 350° C. and 600° C. for a duration between about 1 and 200 seconds to produce the corresponding isomer as represented by the previously stated Formula I or isomers as a mixture represented by Formula I and II.

DESCRIPTION OF THE PREFERRED EMBODIMENT

The suitable 5-methylene metadioxanes which constitute the starting materials of the present invention may be obtained in known ways from the reaction of an appropriate aldehyde and a diol. Preferably, they may also be produced according to the processes described in our copending United States patent application Ser. No. 620,201, filed Dec. 28, 1966, entitled, "Functional Derivatives of Methylene-2-Propanediol-1-3 and the Method for Preparing the Same." According to the methods described in our aforesaid copending application, the starting metadioxanes for the present invention are prepared by reacting an α,β-ethylenic aldehyde such as acrolein with a dienic compound (D) in a Diels-Alder reaction. The resultant cyclic aldehyde is reacted with an alkaline medium in an aldol condensation followed by a Cannizzaro reaction to produce the corresponding gem-dimethylolated derivative of the following formula:

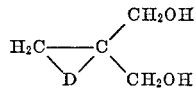

The hydrogen atoms in the hydroxy groups of the gem-dimethylolated derivative are substituted with a methylenic divalent radical to form a corresponding dienic adduct of metadioxane of the formula

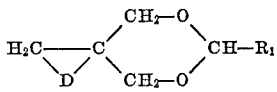

in which $R_1$ has the same meaning as stated hereinabove, and thereafter the dienic adduct of metadioxane is treated at a high temperature to remove the dienic group thereby producing the metadioxane suitable as a starting material of this invention according to the following reaction:

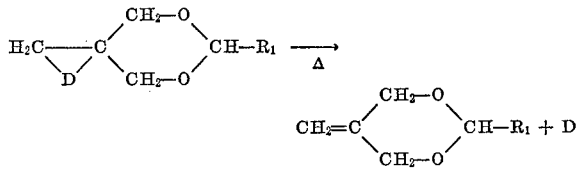

The suitable conjugated dienes (D) include:

(a) The open chain conjugated diolefins such as butadiene, isoprene, piperylene, 2,3-dimethyl butadiene, etc.

In this case, the product from the first step of the reaction is a tetrahydrobenzaldehyde of the formula:

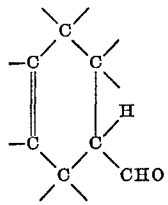

(b) The alicyclic or heterocyclic conjugated diolefins, such as cyclopentadiene and its alkylated derivatives, 1,3-cyclohexadiene, furan, etc. In the case, the product resulting from the reaction of the first stage is a bicyclic aldehyde of the formula

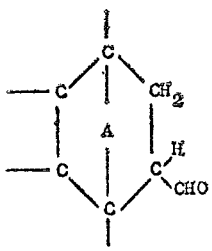

wherein A represents a methylene or ethylene bridge, an oxygen atom, etc., according to the diene utilized.

(c) Anthracene or its derivatives, naphthacene and other polycyclic aromatic compounds known to react as dienic partners in a Diels-Alder reaction. In the case of anthracene, the compounds obtained in the first stage are of the following type:

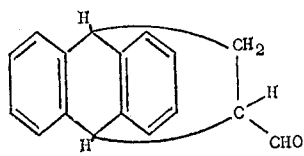

Alternatively, metadioxanes can be prepared directly from 2-methylene-1,3-propanediol by substituting the hydrogen atoms of the hydroxy groups with a methylenic divalent radical. The method of preparing 2-methylene-1,3-propanediol is described in a Weiss et al. copending U.S. patent application Ser. No. 325,493, filed on Nov. 21, 1963, entitled, "A Process for Preparation of Methylene-2-Propanediol-1-3 and its Derivatives."

We found the metadioxanes of the type in which $R_1$ is a vinyl radical as represented by the formula

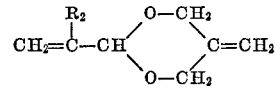

can be prepared advantageously from the following compounds:

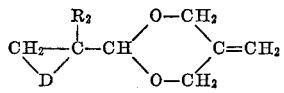 (a)

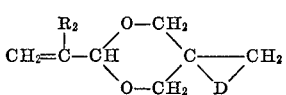 (b)

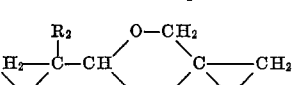 (c)

The pyrolysis of compounds (a), (b), and (c) produces 5-methylene-2-vinyl metadioxanes according to the following equations:

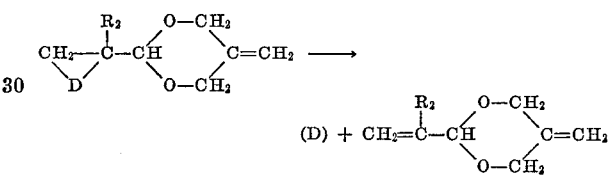

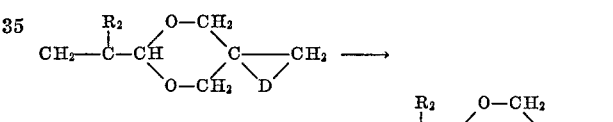

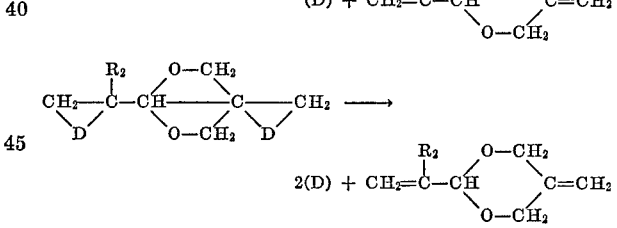

The vinyl substituted metadioxane also may be produced by reacting acrolein with 2-methylene-1,3-propanediol, according to the equation

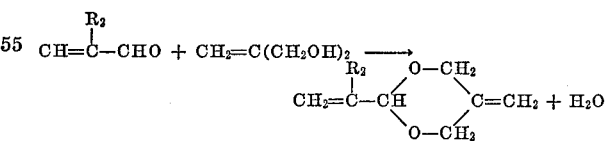

as described in the aforesaid copending United States patent applications.

As stated hereinabove, $R_1$ of the suitable 5-methylene metadioxane is a hydrogen atom, a hydrocarbon radical or a heterocyclic radical containing up to about 18 carbon atoms. Preferably the hydrocarbon radical is selected from the group consisting of alkyl, alkenyl, alicyclic, aralkyl, aralkenyl, aryl, alkaryl, including such radicals when inertly substituted. When $R_1$ is an alkyl, it typically may be a straight chain alkyl or a branched alkyl containing 1 to 18 carbon atoms including methyl, ethyl-n-propyl, i-propyl, n-butyl, t-butyl, i-butyl, n-pentyl, 2-pentyl, n-hexyl, n-heptyl, 3-heptyl, n-dodecyl, and n-ocadecyl. When $R_1$ is an alkenyl, it may contain from 2 to 18 carbon atoms such as vinyl, allyl, propenyl, i-propenyl, 2- penten-2-yl, 3-hepten-3-yl, or oleyl. When $R_1$ is an alicyclic radical it may typically contain 3 to 18 carbon atoms including radicals having 3- to 12-membered rings such as cyclopropyl, cyclobutyl, cyclopentyl, cyclopenten-1-yl, cyclohexyl, cyclohexen-3-yl, 3-methylcyclohexen-3-yl, 4-methylcyclohexen-3-yl, 2-norbornyl, and cyclododecyl. When $R_1$ is an aryl, it may be phenyl or naphthyl which may be mono-, bi- or tri-substituted by groups including alkyl containing 1 to 4 carbon atoms; halogens notably, fluoro, chloro and bromo radicals; and hydroxy, methoxy, ethoxy, carboxy, carbomethoxy, carboethoxy and methylol radicals. For aralkyl and aralkenyl, it may be radicals in which the benzene nucleus is inertly substituted in the same manner as the aryl stated above; preferably the alkyl substituent contains 1 or 2 carbon atoms (i.e., phenylmethyl and phenylethyl) and the alkenyl substituent represents the vinylene group. The suitable heterocyclic radicals include 2-tetrahydrofuryl, 2-furyl, 2-tetrahydropyranyl, 3,4-dihydro (2N)-2-pyranyl, 1,3-dioxolan-2-yl, 2-thienyl, and 4-pyridyl.

In the production of methallylic esters, it was found that their corresponding metadioxanes isomerize under the sole influence of the reaction temperature. The isomerization temperature can be between 350° C. to 600° C. at normal pressure. The preferred temperature for the reaction is between about 420° C. to 500 °C. Temperatures substantially below 350° C. lead to an undersirable slow reaction, and temperatures above 600° C. lead to degradation with reduced yield. When the process is conducted in the preferred temperature range, the yield of methallylic esters is very high.

The thermal rearrangement leading to the isomerization of 5-methylene metadioxane to form the corresponding methallylic ester may be postulated as the result of a hydrogen transfer from position 2 (which is rather unstable because of the presence of two adjacent oxygen atoms in the 6-membered ring) to the position 4 with the breakage of the 3-4 bond by a radical mechanism depicted as follows:

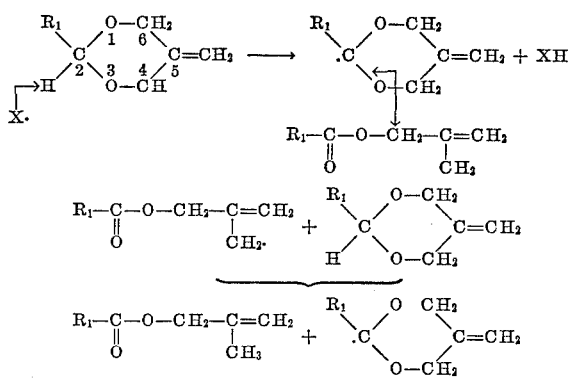

It is noted that this reaction takes place for all suitable metadioxanes stated previously. However, when $R_1$ of the metadioxane is a vinyl group of the formula

wherein $R_2$ is a hydrogen atom or a lower alkyl containing 1 to 5 carbon atoms, the configuration of the metadioxane molecule is favorable to the transfer of a hydrogen atom from the C-4 position to the vinyl group by a circular transfer of electrons. The hydrogen in the allylic position is also very unstable. The allyl-vinyl ether thus formed in the initial electron transfer immediately undergoes a second circular transfer in a Claisen rearrangement which leads to the formation of the dialdehyde as depicted below.

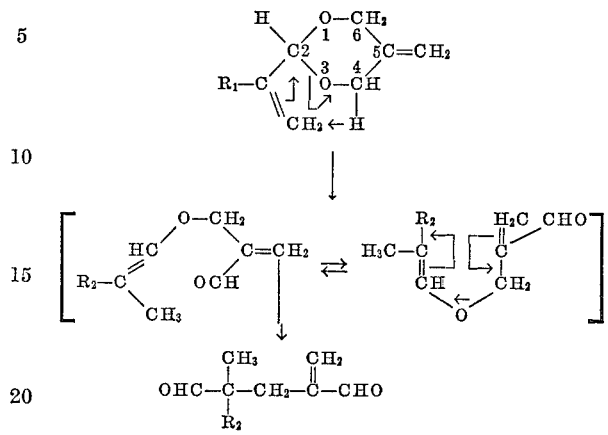

The isomeric transformation of 5-methylene-2-vinyl metadioxane into 2-methyl-4-methylene glutaraldehydes is unexpected. Under the same conditions of reaction, the 5-methylene-2-alkyl (or aryl) metadioxanes produces with very high yields esters of methallylic alcohol.

In the present case, a certain quantity of methallyl acrylate is obtained in the mixture emerging from the reaction zone. The 2-methyl-4-methylene glutaraldehyde constitutes nevertheless in general the preponderant product of the reaction. Moreover, it has been noted that the 5-dimethyl-2-vinyl metadioxane remains unchanged after passage of its vapors over pumice at 480° C. whereas in passing over silica at 340° C. it isomerizes into allyloxypivalic aldehyde according to a mechanism entirely different from that to which the present reaction conforms.

The isomerization of the present invention is carried out advantageously at atmospheric or at a lower pressure, although high pressure without significant advantage can also be employed. In the preferred reaction conditions, the isomerization is carried out in vapor phase. The 5-methylene metadioxane vapor may be diluted with an inert gas such as nitrogen or carbon dioxide. Under these diversified reaction conditions, the duration of the metadioxane vapor remaining in the pyrolysis zone varies within wide limits between about 1 and 200 seconds. In practice, a retention time of the order from 10 to 50 seconds is suitable.

Any reactor vessel suitable for high temperature vapor reaction may be used to carry out the process of the present invention. The vessel, for example, may consist of a tube made of a material capable of withstanding the temperature involved, such as Pyrex glass, steel, stainless steel, nickel, Monel, etc. The vessel may be empty, but to promote heat exchange, it is preferably packed with spheres or rings of glass, ceramics, and stainless steel. Kieselguhr, pumice, kaolin and silicated compounds, which are weakly acidic and which appear to possess a certain catalytic effect on the isomerization may also be used. When a heat transfer material or a catalyst is used in the reaction vessel, a stationary or preferably a fluidized bed may be used to promote the contact of the solid with the reaction vapor.

At the outlet of the reaction vessel, the vapor of the pyrolysis is condensed and the constituents are separated therefrom in known manner, such as by direct rectification. The acetal which has not been transformed is recycled to the reactor.

In preparing the methallylic esters according to the present invention, the dienic adduct of metadioxanes may be used directly as a starting material. This compound when subjected to the action of high temperature, undergoes simultaneous pyrolysis to eliminate the dienic compound (D) and to transform into corresponding methallylic ester according to the following reaction

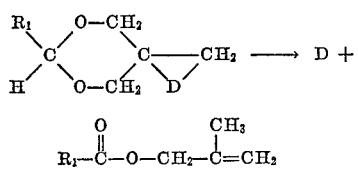

This process effectively eliminates the step of isolating the intermediate, 5-methylene metadioxanes either by directing the raw vapor emerging from the pyrolysis into a second reactor held at a suitable temperature for isomerization, or by introducing directly the dienic compound into a reactor whose temperature makes it possible to effect simultaneously the pyrloysis with liberation of the diene and also isomerization of the 5-methylene-2-vinyl metadioxane under the conditions of the dilution and the contact time selected. The process thus has particular advantage in the production of methallylic esters when the suitable dienic adducts are prepared by reacting aldehydes and diols in accordance with our previous patent application Ser. No. 620,201, referred to hereinabove.

In the alternative process without recovering the intermediates, the reaction conditions, temperatures, pressures, and time are the same as those hereinabove given for the case of a simple isomerization of the acetals. Advantageously, the resultant diene (D) is separated from the ester by filtration or distillation after isomerization. It is preferred to use dienic compounds containing the dienic radical (D) selected from the group consisting of (a) and (b) hereinabove indicated.

Methallylic esters produced in accordance with the methods are suitable for the manufacture of synthetic polymers or resins of various types capable of polymerizing or copolymerizing with other ethylenic monomers.

The new unsaturated dialdehydes of the invention, due to their polyfunctionality, have many uses particularly as intermediates for organic synthesis. For example, they may react with the proteins or polyhydroxylated compounds, such as the caseins, polyvinyl alcohols, and cellulosic products, to reticulate and to render the resultant macromolecules insoluble, due to which the compounds of this invention are particularly useful in the treatment of textiles and papers. The double bond in the molecule also may yield homopolymers or copolymers with other monomers by radical polymerization.

The unsaturated dialdehydes of this invention may be considered as α substituted derivatives of acrolein:

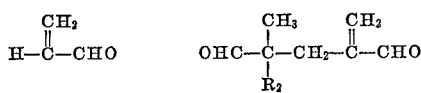

This unique molecular structure enables the dialdehydes of this invention to react not only in a customary manner as saturated glutaraldehydes already known but also to react in polymerization, in Michael addition reactions, and in Diels-Alder dienic synthesis. It is important to note that, as an intermediate, the advantage of the double bond for many reactions is passed onto the products of the reaction, such as the corresponding diacids, the 2-methyl-2R-4-methylene glutaric acids and their esters. Such acids and the α-methylene glutaric esters are useful in polymerization or copolymerization with other vinyl monomers. (See U.S. Patent Nos. 2,522,366; 3,074,999; 3,342,853; and 3,342,854.)

A number of specific examples of the invention will now be given to illustrate both the process and the products thereof.

Example I

Metallylic esters were prepared by isomerization of 5-methylene metadioxanes according to the following reaction

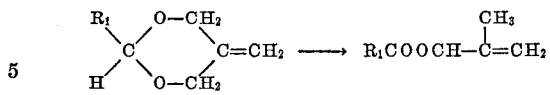

The reactor used comprised a tube of stainless steel 450 millimeters long and 17 millimeters in interior diameter bent into a U-shape and immersed in a bath of fused salt heated to 450°–460° C. The tube was loaded with 70 cc. of pumice particles of 2 to 4 millimeter size. Using a graduated ampule, one end of the tube was connected to a source of nitrogen and at the other end to a water condenser having cold traps for solid which was maintained at a low temperature by Dry Ice and was used for the recovery of the pyrolysis product. The series of runs to be given below, in which the radical $R_1$ was varied, was carried out with 150 gram charges of the reactant introduced at the upper end of the tube at the rate of 50 grams per hour with a nitrogen current of about 10 liters per hour.

The products of pyrolysis were analyzed by gas chromatography for evaluation of the extent of isomerization and yields. The results are listed in Table I. They were additionally subjected to a fractional distillation in order to isolate and characterize the methallylic esters by their infra-red spectra and their mass spectra. The structures have also been identified by saponification of the benzoic esters and isobutyric esters, and also by the characterization of the methallylic alcohol or benzoic acid and isobutyric acid products.

TABLE

| $R_1$ | Prepared methallylic ester | Total amount of corresponding methylenes-metadioxane transformed in percent [1] | Yield of methallylic ester in percent [2] |
|---|---|---|---|
| H | Formiate | 26 | 61.6 |
| $(CH_3)_2CH-$ | Isobutyrate | 42 | 87.6 |
| $CH_2=CH-$ | Acrylate | 73.5 | 25.8 |
| $CH_2=C(CH_3)-$ | Methacrylate | 92 | 39.2 |
|  | Cyclohexene-3 carboxylate | 33 | 88 |
|  | Benzoate | 58.5 | 79.5 |

[1] Quantity employed—quantity recovered/quantity employed.
[2] Moles of ester formed/moles of dioxane transformed.

The methallyl isobutyrate obtained have the following properties:

$E_{20}$ (litt.: E 146–155° C.) _____ °C__ 150
$n_D^{20}$ (litt.: $n_D^{20}$ 1.4174) _____ 1.417
$d_4^{20}$ _____ 0.8884

For the methallyl-benzoate obtained, its characteristics were as follows:

$E_5$ _____°C__ 101–102
$n_D^{20}$ _____ 1.5145
$d_4^{20}$ _____ 1.0345

The isobutyric acid obtained by saponification of methallyl isobutyrate produced a salt of S-benzylisothiouronium melting at 143° C. (literative value 142–142.5° C.). The benzoic acid resulting from the methallyl benzoate fused at 122.4° C. and did not exhibit any depression of its fusion point by mixing with a sample of authentic benzoic acid.

Example II

Methallyl formiate and benzoate were prepared by pyrolysis of acetals of 2,2-dihydroxymethyl-5-norbornene which was produced according to the process described in the two above identified copending United States patents.

(a) Methallyl formiate.—In a first reaction stage, cyclopentadiene reacted with acrolein to form 2-formyl-5-norbornene. For the details of the reaction, see Roger Adams, Organic Reactions, volume 4, page 90, John Wiley & Sons, 1948. Secondly, this product was reacted with formaldehyde to obtain 2,2-dihydroxymethyl-5-norbornene. These first two steps were carried out according to the mode of operation set forth in the Weiss et al. United States patent application above cited. In a third step, the formal spiro-5,2'-m-dioxane-5'-norbornene of this diol was prepared according to the procedure set forth in our copending patent application. Lastly, this product was pyrolyzed under the conditions of Example I, the reactor being loaded with glass marbles instead of pumice grains. The pyrolysis was substantially complete, and the cyclopentadiene was recovered with a yield of 96%. In addition, there were obtained 19 moles of methallyl formiate and 74 moles of 5-methallyl metadioxane for 100 moles of spiro-5,2'-m-dioxane-5'-norbornene utilized to give a yield of 93% in ther product of pyrolysis and isomerization. The yield in methallyl formiate by reference to the metadioxane transformed amounted to 73%.

(b) Methallyl benzoate.—The process was carried out as outlined in the immediate preceding paragraphs under (a). The 2-phenyl spiro-5,2'-m-dioxane-5'-norbornene was first prepared according to the method described in our copending application. This product was then pyrolyzed under the conditions set forth in Example I. The pyrolysis was complete and 98% of the theoretically available cyclopentadiene was recovered. Moreover, 44 moles of methallyl benzoate and 49.5 moles of 5-methylene-2-phenyl-metadioxane for 100 moles of 2-phenyl spiro-5,2'-m-dioxane-5'-norbornene employed were recovered. This amounts to a yield of 93.5% in products of pyrolysis and isomerization. The yield of methallyl benzoate, by referenc to the metadioxane transformed, amounted to 87%.

In contrast, when the pyrolysis was carried out at a lower temperature between 400° C. and 420° C., the isomerization did not take place and there were obtained, respectively, for 100 moles of cyclic acetal, in the first case, 92 moles of 5-methylene metadioxane and, in the second case, 88.5 moles of 5-methylene-2-phenyl metadioxane without any detectable quantity of isomeric methallylic esters.

Example III 5-methylene-2-vinyl-metadioxane was introduced into the top of a stainless steel tube 450 millimeters in length and 17 millimeters in interior diameter, loaded with glass marbles and heated to between 450° C. and 460° C. at a rate of 50 grams per hour. At the same time, a current of nitrogen at the rate of 20 liters per hour passed through the tube. The reaction products were recovered by condensation in a water refrigerator followed by a cold trap held cold by Dry Ice.

The test lasted for four hours. 200 grams (1.58 moles) of material were placed in reaction, of which 189 grams of gross products were recovered. The products, according to gas chromatography analysis, had the following composition:

5-methylene-2-vinyl metadioxane not transformed—53 grams (0.42 moles).
Methallyl acrylate—38 grams (0.30 moles).
2-methyl-4-methylene-glutaraldehyde—68 grams (0.54 moles).
Cutting compounds (acrolein methylene-2 propane-diol 1-3, etc.—26 grams.
Nonvolatile sub-products—4 grams.

73.5% of the 5-methylene-2-vinyl metadioxane employed had thus been transformed. By reference to the 5-methylene-2-vinyl metadioxane transformed the yield was as follows:

25.9% in methallyl acrylate and 46.5% in 2-methyl-4-methylene glutaraldehyde.

Rectification of the reaction mix at a pressure of 100 millimeters of mercury yielded a colorless liquid fraction titrating 92% to 95% of 2-methyl-4-methylene glutaraldehyde (dosage by kas chromatography) having the following characteristics:

| | |
|---|---|
| $E_{100}$ | ° C__ 130–135 |
| $E_3$ | 55–56 |
| $n_D^{20}$ | 1.4635 |
| $d_4^{20}$ | 0.982 |

The structure of the product was determined by means of pure samples taken by a preparatory gas chromatography. Utlra-violet spectrum (solution of 1 gram per liter in methanol) produced maxima at $219\mu$ ($\epsilon$: 9000) and $288\mu$ ($\epsilon$: 44).

Infra-red-red spectra: characteristic bands of a solution in carbon tetrachloride (cm.$^{-1}$): 945, 1635, 3100 (double bond) 1735, 2720 (aldehyde), 1705 (conjugate aldehyde). The mass spectrum confirmed the existence of a molecular weight of 126. The nuclear magnetic resonance spectrum indicated the presence of two protons belonging to CHO groups, of one $CH_2{=}C{-}$ group, and of one $CH_3{-}C{\equiv}$.

Example IV

Preparation of 2-methyl-4-methylene glutaraldehyde was carried out by direct pyrolysis of the spiro-2-[(5-norbornene-2-yle)-5,2'-metadioxane-5'-norbornene-] prepared in a boiling reaction of 61 grams (0.5 mole) of 2-formyl-5-norbornene and 77 grams (0.5 mole) of 2,2-di-(hydroxymethyl)-5-norbornene in 200 cc. of benzene in the presence of 1 gram of p-toluene sulfonic acid as a catalyst.

The water of reaction was eliminated by distillation as an azeotropic mixture along with the benzene. After the reaction, the catalyst was neutralized by sodium bicarbonate, and the benzene was distilled. The reaction product was obtained in the form of colorless crystals melting at 160° C.; the yield was 123 grams, i.e., 95% of the theoretical amount.

The spiro compound was pyrolyzed under the conditions of Example III according to the following reaction:

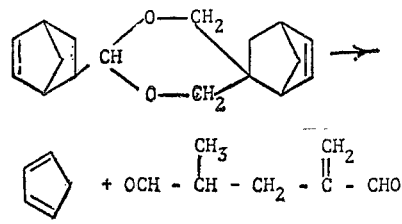

The cyclopentadiene was recovered or regenerated with a yield of 94%.

The amount transformed is listed below expressed as moles of product for 100 moles of spiro-2-[(5-norbornene-2-yle)-5,2'-metadioxane-5'-norbornene]:

| | Percent |
|---|---|
| 2-methyl-4-methylene glutaraldehyde | 36 |
| Methallyl acrylate | 19 |
| 5-methylene vinyl metadioxane | 28 |

This last product could be isomerized to produce 2-methyl-4-methylene glutaraldehyde by the process in accordance with Example III.

Example V 2,2-dimethyl-4-methylene glutaraldehyde

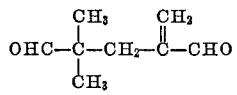

was prepared by pyrolysis of 5-methylene-2-(1-methyl vinyl)-metadioxane.

98 grams (0.70 mole) of 5-methylene-2-(1-methyl vinyl) metadioxane were introduced over a time of 2 hours into a stainless steel tube 450 millimeters in length and 17 millimeters in internal diameter loaded with glass beads and heated to 450° C. to 460° C. At the same time, a current of nitrogen of 20 liters per hour was passed through the tube in order to dilute the reacting vapors.

The products of reaction were passed into a water refrigerant functioning as a condenser followed by a cold trap cooled with Dry Ice.

95.5 grams of the pyrolysis product were recovered. Analysis thereof by gas chromatography indicated that it contained:

7.8 grams (0.056 mole) of 5-methylene-2-(1-methyl vinyl) metadioxane not transformed 35.3 grams (0.252 mole) of methallyl methacrylate 11.8 grams (0.94 mole) of 2,2-dimethyl-4-methylene glutaraldehyde By rectification of the mixture at a pressure of 10 millimeters of mercury, the 2,2-dimethyl-4-methylene glutaraldheyde was isolated which is a liquid boiling at from 85° C. to 90° C. at 10 millimeters of mercury.

We claim:

1. A method of isomerizing 5-methylene metadioxane of the formula

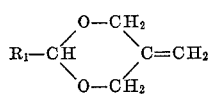

wherein $R_1$ is a hydrogen atom, a hydrocarbon radical or a heterocyclic radical having up to 18 carbon atoms which comprises subjecting said metadioxane to the action of a high temperature between about 350° C. and about 600° C. and for a duration of about 1 to 200 seconds to produce (I) a methallylic ester of the formula

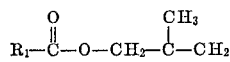

or to produce when $R_1$ of the said metadioxane is a vinyl radical of the formula

wherein $R_2$ is a hydrogen atom or a lower alkyl containing 1 to 5 carbon atoms, a mixture of (I) and (II) 2-methyl-4-methylene glutaraldehyde of the formula

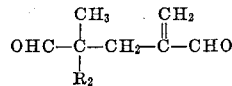

2. A method of claim 1 wherein $R_1$ is a hydrogen atom, an alkyl containing 1 to 18 carbon atoms, an alkenyl containing 2 to 18 carbon atoms, an alicyclic radical containing from 3 to 18 carbon atoms, an aryl selected from the group consisting of phenyl and naphthyl, an alkaryl or a heterocyclic radical containing less than about 18 carbon atoms.

3. A process according to claim 2 wherein the temperature is between about 420° C. and 500° C. and said duration is between 10 seconds and 50 seconds.

4. A process of claim 3 wherein the isomerization is conducted in a gaseous state and in the presence of a gaseous diluent.

5. A process according to claim 4 wherein the gaseous diluent is nitrogen or carbon dioxide.

6. A method for preparing 2-methyl-4-methylene glutaraldehyde of the formula

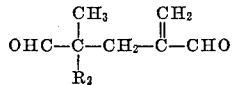

wherein $R_2$ is a hydrogen atom or a lower alkyl containing 1 to 5 carbon atoms, said method comprising thermal isomerizing at a temperature in the range between 350° C. and 600° C. and for a duration between 1 and 200 seconds 5-methylene-2-vinyl metadioxane of the formula

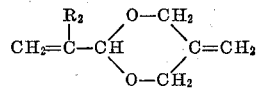

and thereafter recovering 2-methyl-4-methylene glutaraldehyde therefrom.

7. A method according to claim 6 wherein the thermal isomerization is carried out at 420° C. to 500° C. for a duration of 10 to 50 seconds and in the presence of nitrogen or carbon dioxide as a diluent.

8. A method of preparing a methallylic ester comprising introducing into a reaction zone 5-methylene-metadioxane of the formula

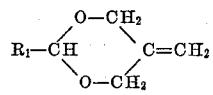

wherein $R_1$ is a hydrogen atom, a hydrocarbon radical or a heterocyclic radical having up to 18 carbon atoms, maintaining said metadioxane is a gaseous state in said reaction zone at a temperature between about 350° C. and about 600° C. for a duration between about 1 second and about 200 seconds, and recovering therefrom the corresponding methallylic ester isomer of the formula

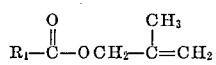

9. A method according to claim 8 wherein $R_1$ is a hydrogen atom, an alkyl containing 1 to 18 carbon atoms, an alkenyl containing 2 to 18 carbon atoms, an alicyclic radical containing from 3 to 18 carbon atoms, an aryl selected from the group consisting of phenyl and naphthyl, an alkaryl or a heterocyclic radical containing less than about 18 carbon atoms.

10. A method according to claim 9 wherein the temperature is between about 420° C. and 500° C. and said duration is between 10 and 50 seconds.

11. A method according to claim 10 wherein the reaction is carried out in the persence of a gaseous diluent which is nitrogen or carbon dioxide.

12. 2-methyl-4-methylene glutaraldehyde of the formula

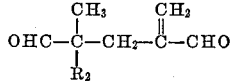

wherein $R_2$ is a hydrogen atom or a lower alkyl containing 1 to 5 carbon atoms.

References Cited

UNITED STATES PATENTS 2,820,820   1/1958   Montaga et al.
3,271,377   9/1966   Mantell et al.

FOREIGN PATENTS 706,176   3/1954   Great Britain.

LORRAINE A. WEINBERGER, *Primary Examiner.*

A. P. HALLUIN, *Assistant Examiner.*

U.S. Cl. X.R.

260—410.9, 487, 484, 485, 295, 332.2, 347.4, 347.5, 486, 488, 496, 340.7, 476, 469, 598, 601, 599, 345.8

PO-1050
(5/69)

UNITED STATES PATENT OFFICE
CERTIFICATE OF CORRECTION

Patent No. 3,444,238          Dated May 13, 1969

Inventor(s) Francis Weiss and Arsene Isard

It is certified that error appears in the above-identified patent and that said Letters Patent are hereby corrected as shown below:

Column 2, line 40, "$CH_3$" should read "$CH_2$".

Column 11, line 12, "(0.94)" should read "(0.084 moles)"

Column 12, line 25, "is" should read "in"

SIGNED AND
SEALED
JUL 14 1970

(SEAL)
Attest:

Edward M. Fletcher, Jr.
Attesting Officer

WILLIAM E. SCHUYLER, J.
Commissioner of Patent.